(12) United States Patent
Achart

(10) Patent No.: US 7,605,495 B2
(45) Date of Patent: Oct. 20, 2009

(54) DUAL SUPPLY CIRCUIT

(75) Inventor: Raynald Achart, Pernay (FR)

(73) Assignee: STMicroelectronics SA, Montrouge (FR)

( * ) Notice: Subject to any disclaimer, the term of this patent is extended or adjusted under 35 U.S.C. 154(b) by 525 days.

(21) Appl. No.: 11/244,423

(22) Filed: Oct. 5, 2005

(65) Prior Publication Data

US 2006/0076937 A1    Apr. 13, 2006

(30) Foreign Application Priority Data

Oct. 8, 2004    (FR) .................................. 04 52321

(51) Int. Cl.
*G05F 1/577* (2006.01)
(52) U.S. Cl. ....................... 307/15; 323/267
(58) Field of Classification Search ............. 363/44; 323/267; 307/15, 42, 82
See application file for complete search history.

(56) References Cited

U.S. PATENT DOCUMENTS

| | | | |
|---|---|---|---|
| 4,636,709 A * | 1/1987 | Ohsawa ....................... 323/267 |
| 5,615,097 A * | 3/1997 | Cross ........................... 363/84 |
| 5,796,599 A | 8/1998 | Raonic et al. .................. 363/57 |
| 6,255,806 B1 | 7/2001 | Seppänen et al. ............ 323/210 |
| 2004/0135618 A1 | 7/2004 | Peron .......................... 327/403 |
| 2006/0067094 A1* | 3/2006 | Weber .......................... 363/63 |

* cited by examiner

*Primary Examiner*—Albert W Paladini
*Assistant Examiner*—Daniel Cavallari
(74) *Attorney, Agent, or Firm*—Lisa K. Jorgenson; Robert Iannucci; Seed IP Law Group PLLC

(57) ABSTRACT

A circuit intended to provide two D.C. voltages of inverted polarities based on an A.C. voltage, comprising: two capacitors having their respective electrodes connected to two terminals intended to receive said A.C. voltage and having their second respective electrodes connected to each other by two first diodes in anti-series; a controllable current source having a first terminal connected to the common anodes of said first diodes; two second diodes connected in anti-series between said terminals intended to receive said A.C. voltage and having their common cathodes connected to a second terminal of said controllable current source; a circuit for controlling said current source; and two third diodes connected in anti-series between said terminals intended to receive said A.C. voltage, said control circuit sampling its power supply between the common cathodes of the second diodes and the common anodes of the third ones.

17 Claims, 4 Drawing Sheets

DUAL SUPPLY CIRCUIT

BACKGROUND OF THE INVENTION

1. Field of the Invention

The present invention relates to the field of circuits providing a dual power supply from an A.C. voltage. An example application of the present invention is the generation of supply voltages of control blocks of a power variator intended to be series-connected with a load to be supplied by an A.C. voltage (generally the mains voltage), and based on two switches which are bi-directional for the voltage and unidirectional for the current, connected in anti-parallel.

2. Description of the Related Art

FIG. 1 schematically shows a conventional example of circuit 1 for controlling the power variation of a load Q supplied by an A.C. voltage Vac. Two switches K1 and K2, formed, for example, of IGBT transistors with a reverse voltage hold, are connected in anti-parallel between two terminals 2 and 3 of the power variator. The variator is series-connected with load Q between two terminals P and N of application of voltage Vac. Each transistor K1 or K2 has its gate connected to the output of a circuit (circuits 4 (DRV1) and 5 (DRV2) respectively), generating an appropriate control signal based on a power reference. The power variation is performed with a phase angle and consists of controlling the turn-on (or turn-off) time of transistors K1 and K2 according to the considered halfwave of the A.C. voltage. The power setting is performed by circuits 4 and 5 which, for example, receive a reference signal CTRL. In the example of FIG. 1, supply voltages V1 and V2 are respectively supplied by circuits 6 (ALIM1) and 7 (ALIM2) extracting D.C. voltages V1 and V2 respectively from the voltage between terminals 2 and 3, and between terminals 3 and 2 respectively.

Other power switches K1 and K2 may be used. For example, these may be MOS or IGBT transistors, each in series with a diode, or thyristors.

A recurrent problem of this type of circuit is to provide control circuits 4 and 5 with supply voltages V1 and V2 as well as with a common control reference, because circuits 4 and 5 are not referenced to the same potential (the potential of node 3 is used for circuit 4 and the potential of node 2 is used for circuit 5).

FIG. 2 shows a conventional example of an assembly for providing supply voltages V1 and V2 at the same time as a common control signal for the two circuits 4 and 5. For simplification, transistors K1 and K2 and the load have not been shown in FIG. 2.

Each supply circuit 6, 7 is formed of a capacitor C1, C2 respectively, across which is sampled voltage V1, V2, respectively. Capacitor C1 or C2 is in series with a diode D1, D2, respectively, and this series association is connected in parallel with a zener diode DZ1, DZ2, respectively, setting the value of voltage V1, respectively V2. Supply Circuits 6 and 7 are, in this example, connected to each other by a potentiometer P intended to set the power reference desired for the load. The power variation is then performed by setting the time of provision of the corresponding supply voltage to circuits 4 and 5 with respect to the zero crossings of voltage Vac. In positive halfwaves (positive voltage Vac between terminals P and N, FIG. 1), voltage Vdim across terminals 2 and 3 of the power variator is also positive. A current then flows through forward-biased diode DZ2, through potentiometer P, then through forward-biased diode D1, to charge capacitor C1. The value of potentiometer P conditions the charge speed of capacitor C1. Diode DZ1 sets, by its threshold voltage, voltage V1. In negative halfwaves, a current flows in diode DZ1, then in potentiometer P, then into diode D2, to charge capacitor C2. The value of potentiometer P conditions the charge speed of capacitor C2. Diode DZ2 sets, by its threshold voltage, voltage V2.

Assemblies such as those of FIGS. 1 and 2 are described, for example, in European patent number EP1,416,620 of the applicant.

FIG. 3 shows another conventional example of an assembly for providing D.C. supply voltages V1 and V2 of opposite polarities from an A.C. voltage. As applied to a power variator, the assembly of FIG. 3 provides voltages V1 and V2 to circuits 4 and 5 of FIG. 1. Starting from the assembly of FIG. 2, potentiometer P is replaced with an active control circuit 8. Circuit 8 is formed of a MOS transistor M forming a variable current source, linearly controllable by an electronic circuit 9 (CT), and interposed between the two circuits 6 and 7 of provision of supply voltages V1 and V2. To enable an operation by means of a single MOS transistor, four diodes D3, D4, D5, and D6 are assembled in a fullwave bridge between the respective anodes of diodes D1 and D2 (or the respective cathodes of zener diodes DZ1 and DZ2). For example, the anode of diode D3 and the cathode of diode D5 are connected to the anode of diode D2, while the anode of diode D4 and the cathode of diode D6 are connected to the anode of diode D1. The cathodes of diodes D3 and D4 and the anodes of diodes D5 and D6 are respectively connected to supply terminals 10 and 11 of circuit 9. MOS transistor M forming the variable current source is, in practice, in series with a resistor R between terminals 10 and 11. Circuit 9 typically comprises a resistor R9 between the drain and the gate of transistor M and a zener diode DZ9 between the gate of transistor M and terminal 11.

An active supply circuit such as described in relation with FIG. 3 enables reduction of losses when the load is in standby and needs not be supplied, since circuit 9 can then control the turning-off of transistor M. However, this requires modifying circuit 9 so that it exploits information about voltages V1 and V2. Now, the provision of such information poses a reference problem, since circuit 9 has no common reference with voltages V1 and V2. It could be devised to use two opto-couplers to transmit this information to circuit 9. An obvious disadvantage however is the cost and bulk.

BRIEF SUMMARY OF THE INVENTION

The present invention provides a dual supply circuit with an active control, for use, for example, with a power variator.

The present invention especially avoids the use of opto-couplers to transmit voltage detection information to the active control circuit.

The present invention also provides a solution compatible with the use of a single active control circuit.

The present invention provides a solution adapted to the forming of a power variator based on IGBT transistors.

The present invention provides a circuit intended to provide two D.C. voltages of inverted polarities based on an A.C. voltage, comprising;

two capacitors having their respective electrodes connected to two terminals intended to receive said A.C. voltage and having their second respective electrodes connected to each other by two first diodes in anti-series;

a controllable current source having a first terminal connected to the common anodes of the series association of said first diodes;

two second diodes connected in anti-series between said terminals intended to receive said A.C. voltage and having their common cathodes connected to a second terminal of said controllable current source;

a circuit for controlling said current source; and two third diodes connected in anti-series between said terminals intended to receive said A.C. voltage, said control circuit sampling its power supply between the common cathodes of the second diodes and the common anodes of the third ones.

According to an embodiment of the present invention, the current source is formed of a MOS transistor.

The present invention also provides a circuit for controlling the power variation of two switches, bi-directional for the voltage and unidirectional for the current, assembled in anti-parallel, in series with an A.C. load, comprising two identical control stages respectively dedicated to each switch, each control stage receiving a bias voltage inverted with respect to the other.

According to an embodiment of the present invention, said switches are IGBT transistors.

The foregoing and other objects, features, and advantages of the present invention will be discussed in detail in the following non-limiting description of specific embodiments in connection with the accompanying drawings.

DETAILED DESCRIPTION OF THE INVENTION

Figure 1:
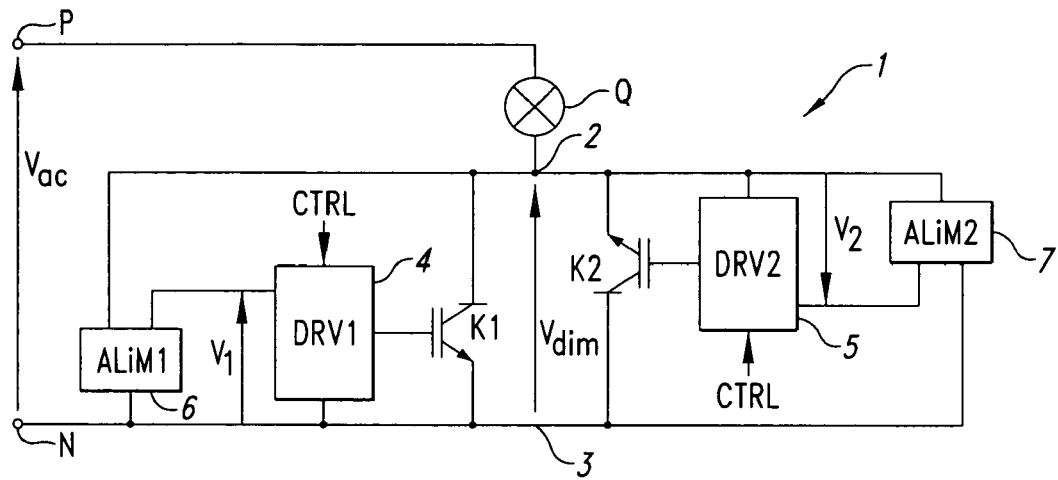
FIGS. 1, 2, and 3, previously described, are intended to show the state of the art and the problem to be solved.

Same elements have been designated with same reference numerals in the different drawings. For clarity, only those elements which are necessary to the understanding of the present invention have been shown in the drawings and will be described hereafter. In particular, the details constitutive of the control circuits (DRV1 and DRV2, FIG. 1) of the power transistors have not been discussed, the present invention being compatible with any conventional control circuit and especially those provided in above-mentioned European patent number EP1,416,620.

The present invention will be described hereafter in relation to a power variator application. However, the present invention more generally applies to any provision of two D.C. voltages of opposite polarities from an A.C. voltage.

Figure 2:
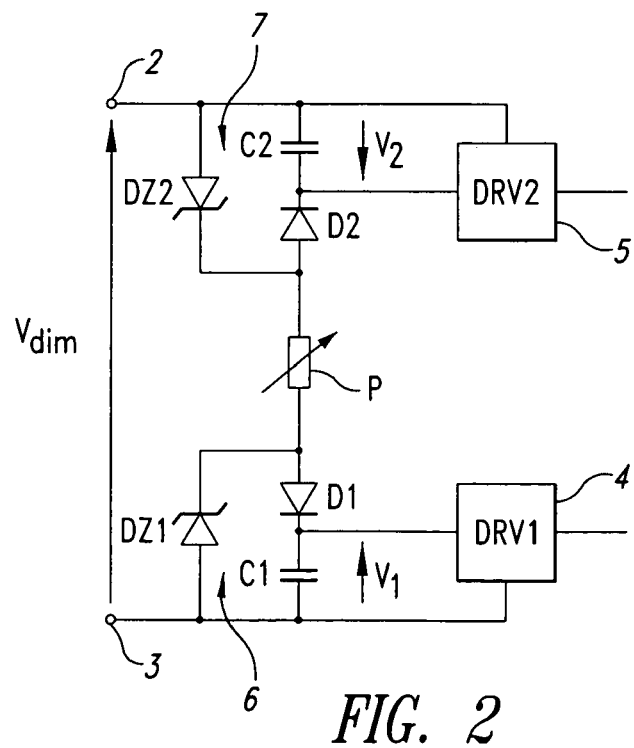
Figure 4:
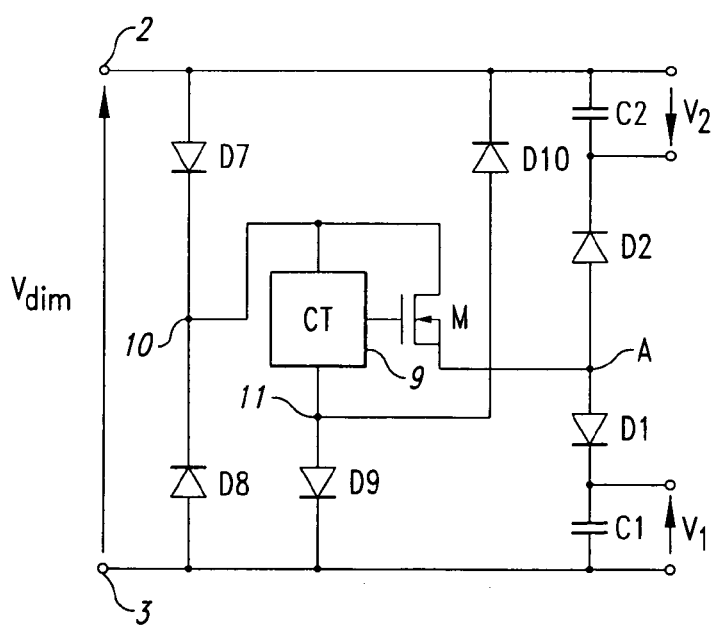
FIG. 4 schematically shows in the form of blocks an embodiment of a dual supply circuit according to the present invention.

FIG. 4 schematically shows in the form of blocks a dual supply circuit with a switched ground according to an embodiment of the present invention. This circuit is, for example, intended to be inserted in a power variator assembly of the type of those shown in FIGS. 1 and 2 to provide voltages V1 and V2 to stages (4 and 5, See FIG. 1 or 2) of control of power transistors of IGBT type or others.

The respective voltages V1 and V2 are provided by capacitors C1 and C2, the reference of voltage V1 corresponding to a terminal 3 while the reference of voltage V2 corresponds to a terminal 2 of the power variator. The other electrodes of capacitors C1 and C2 are connected to each other by two diodes D1 and D2 connected in anti-series. The common anodes of diodes D1 and D2 are, in this embodiment, connected to the source of a transistor M (for example, of MOS type) controlled by an active circuit 9. According to a first embodiment, circuit 9 (CT) is of the type described in relation with FIG. 3. The transistor M drain is connected to the common cathodes of two diodes D7 and D8 having their respective anodes connected to terminals 2 and 3. Circuit 9 has a first terminal (terminal of resistor R9 opposite to zener diode DZ9 not shown in FIG. 4) connected to common cathodes 10 of diodes D7 and D8, its other terminal 11 (anode of diode DZ9) being connected via diodes, respectively D9 and D10, to terminals 3 and 2.

In positive halfwaves (in the orientation taken in the drawings for voltage Vdim between terminals 2 and 3), a current flows through diode D7, then through transistor M to charge capacitor C1 via diode D1. The voltage across circuit 9 is positive between terminals 10 and 11.

In negative halfwaves, a current flows through diode D8, then through transistor M, to charge capacitor C2 through diode D2. The supply voltage of circuit 9 remains positive between terminals 10 and 11.

Functionally, this amounts to switching the ground of the D.C. supply voltage provision circuit and to branching the current of the common transistor towards the two power supplies.

Figure 3:
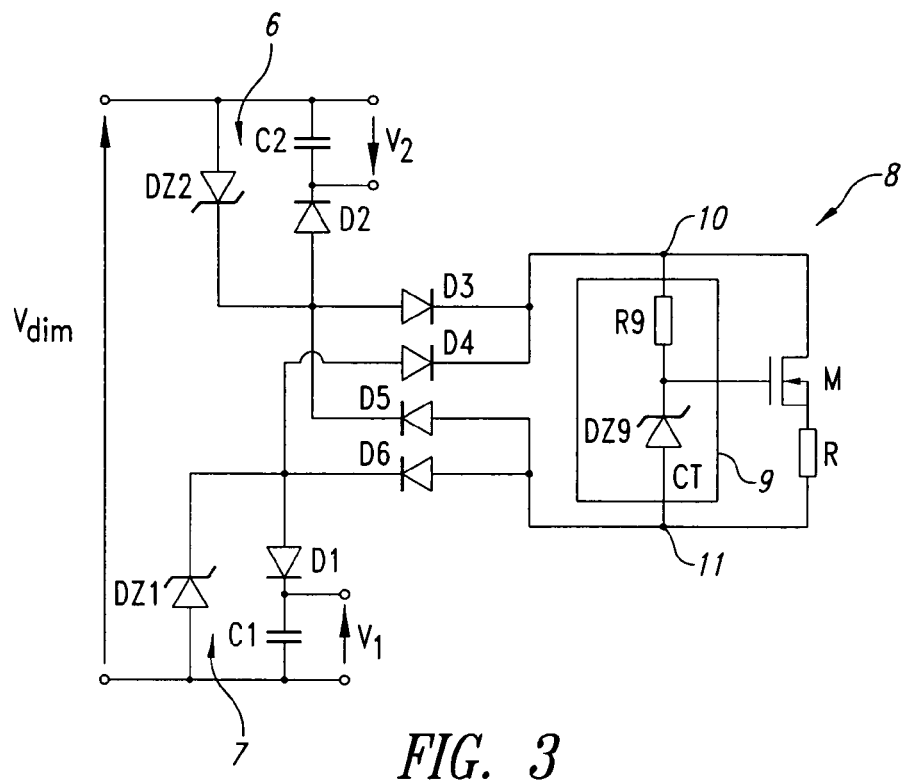

An advantage is that the number of diodes in series between terminals 2 and 3 for the generation of the supply voltages is limited to two (D7 and D9, or D8 and D10) while it is four (DZ2, D3, D6, and D1, or DZ1, D4, D5, and D2) in the conventional assembly of FIG. 3. This limits the voltage drop.

The respective charge speeds of capacitors C1 and C2 are conditioned by the control signal received by transistor M, and thus by the voltage across terminals 2 and 3.

Figure 5:
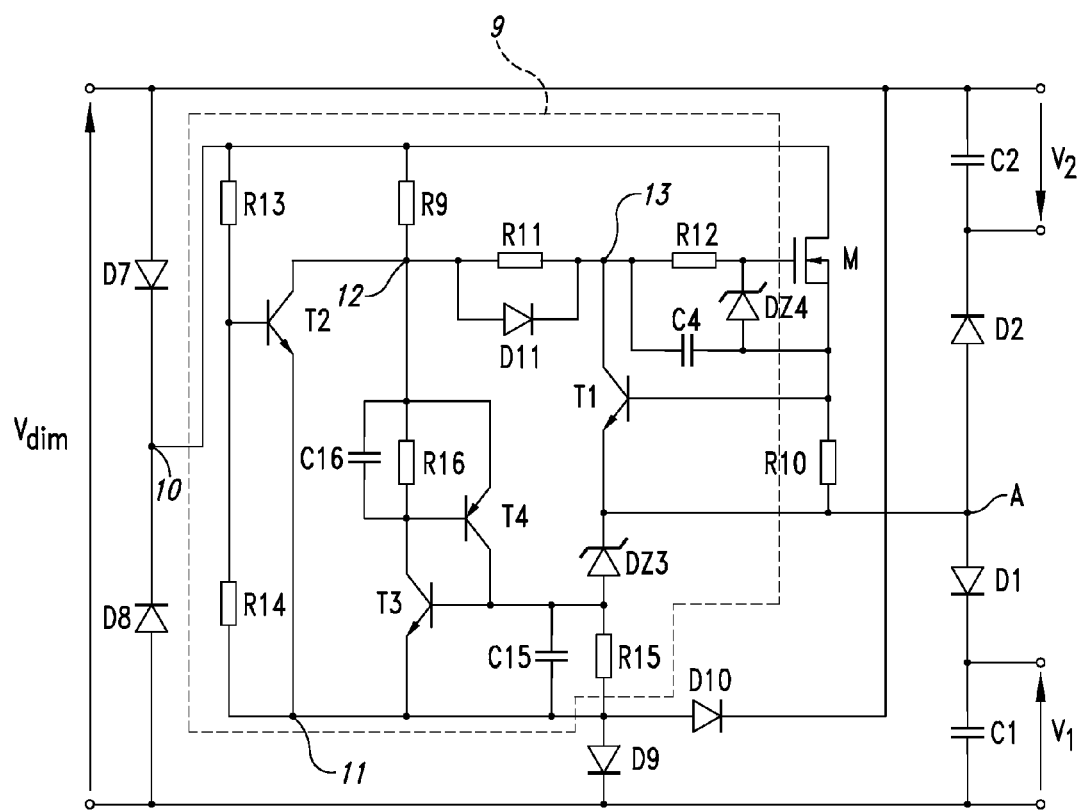
FIG. 5 is a detailed schematic diagram of the supply circuit of FIG. 4.
Figure 6:
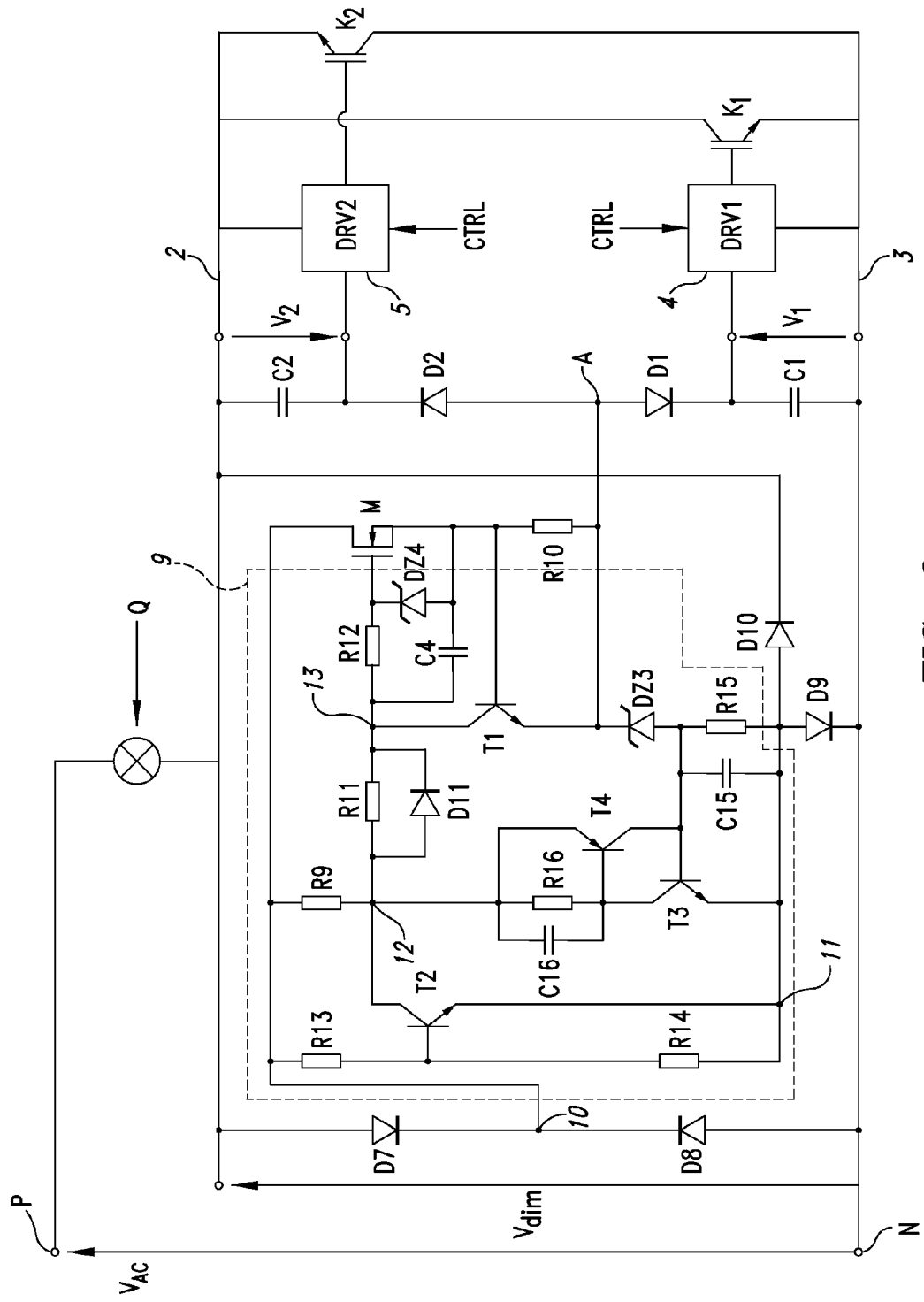
FIG. 6 shows an embodiment wherein the supply circuit of FIG. 5 is connected to circuit elements of FIG. 1.

FIG. 5 shows a detailed schematic diagram of another embodiment of circuit 9 in the environment of FIG. 4. A resistor R10 is interposed between the source of transistor M and common anodes A of diodes D1 and D2. This resistor is used to bias an NPN-type bipolar transistor T1 having its base connected to the junction point of transistor M and of resistor R10. The emitter of transistor T1 is connected to point A and its collector is connected to junction point 13 of two resistors R11 and R12 in series between the gate of transistor M and a point 12, connected by resistor R9 to point 10. Transistor T1 and resistor R10 are used to limit the current in transistor M. Resistor R11 is in parallel with a diode D11, and resistor R12 is in parallel with a series assembly of a capacitor C4 and a zener diode DZ4, the cathode of diode DZ4 being connected to the gate of transistor M. This junction point (anode of zener diode DZ4) is further connected to the source of transistor M. Diode DZ4 is used as a protection of the gate of transistor M. Resistor R11 is used to set the discharge speed of the gate of transistor M differently from the speed of its charge.

The control circuit prevents the two D.C. voltages from exceeding a predetermined voltage.

The emitter of transistor T1 is further connected, by a zener diode DZ3 in series with a resistor R15 to terminal 11, resistor R15 being in parallel with a capacitor C15 forming an RC cell. Diode DZ3, resistor R15, and capacitor C15 are used to set the levels of voltages V1 and V2.

The control circuit substantially prevents current from flowing through the current regulator when the A.C. voltage exceeds a predetermined voltage.

A second NPN-type bipolar transistor T2 connects points 12 and 11, the base of this transistor being connected to the junction point of two resistors R13 and R14 forming a resistive dividing bridge between terminals 10 and 11. Resistors R13, R14 and transistor T2 are used to allow the charge of capacitors C1 and C2 when voltage Vdim is smaller than the threshold set by resistive dividing bridge R13, R14 to reach the base-emitter saturation voltage of transistor T2.

Point 12 is connected, by a resistor R16 in series with an NPN-type bipolar transistor T3, to terminal 11, resistor R16 being in parallel with a capacitor C16. The base of transistor T3 is connected to the anode of diode DZ3 and, by a PNP-type transistor T4 having its base connected to the collector of transistor T3, to terminal 12. Capacitor C16, resistor R16, and transistors T3 and T4 ensure a thyristor function which discharges the gate of transistor M when capacitors C1 and C2 have reached the desired charge levels.

The power variation is performed by conventional circuits (4 and 5, FIGS. 1 and 2), the circuit of the present invention providing voltages V1 and V2.

An advantage of the embodiment of FIG. 5 is that the capacitor charge is performed at the beginning and at the end of a halfwave of the A.C. power supply, which avoids current peaks.

Of course, the present invention is likely to have various, alterations, improvements, and modifications which will readily occur to those skilled in the art. In particular, the sizing of the different components and of the circuit are within the abilities of those skilled in the art according to the desired application. Further, although the present invention has been described in relation with a power variator assembly, it more generally applies to any provision of two D.C. voltages V1 and V2 from an A.C. voltage. In the circuits discussed as an example, the A.C. voltage is then applied between terminals 2 and 3.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A circuit configured to provide two D.C. voltages of inverted polarities based on an A.C. voltage across a first A.C. terminal and a second A.C. terminal, comprising:
   two first diodes having respective anodes directly connected together in common and respective cathodes;
   two capacitors having respective first electrodes respectively connected to the first and second terminals of said A.C. voltage and having respective second electrodes respectively connected to the cathodes of the two first diodes;
   a controllable current source having a first terminal connected to the anodes of said first diodes;
   two second diodes having respective anodes connected respectively to said A.C. terminals and having respective cathodes directly connected together in common and connected to a second terminal of said controllable current source;
   a first control circuit configured to control said current source; and
   two third diodes having respective anodes directly connected together in common and respective cathodes connected to said A.C. terminals, respectively, said control circuit sampling a power supply between the cathodes of the second diodes and the anodes of the third diodes.

2. The circuit of claim 1, wherein the current source is formed of a MOS transistor.

3. The circuit of claim 1 comprising a second control circuit for controlling a power variation of two switches, unidirectional for current, assembled in parallel, in series with an A.C. load, comprising two identical control stages respectively dedicated to the switches, each control stage receiving a respective one of the two D.C. voltages.

4. The circuit of claim 3, wherein said switches are IGBT transistors.

5. A circuit for providing two D.C. voltages comprising:
   first and second input terminals configured to receive an A.C. voltage;
   a first capacitor comprising a first electrode and a second electrode, the first electrode being connected to the first input terminal, wherein a first D.C. voltage is provided across the first capacitor;
   a second capacitor comprising a first and a second electrode, the first electrode of the second capacitor being connected to the second input terminal, wherein a second D.C. voltage is provided across the second capacitor;
   a first diode pair of diodes having respective anodes directly connected together in common, and respective cathodes respectively connected to the second electrodes of the first and second capacitors;
   a second diode pair of diodes having respective cathodes directly connected together in common, the second diode pair coupling the first input terminal to the second input terminal;
   a current regulator comprising a first terminal coupled to the anodes of the first diode pair and a second terminal coupled to the cathodes of the second diode pair; and
   a control circuit coupled to the cathodes of the second diode pair of diodes and configured to control current flowing through the current regulator.

6. The circuit of claim 5, wherein the reference circuit comprises a third diode pair of diodes having respective anodes directly connected together in common, the third diode pair coupling the first input terminal to the second input terminal, wherein the control circuit is coupled to the anodes of the third diode pair.

7. The circuit of claim 5, wherein the control circuit prevents the two D.C. voltages from exceeding a predetermined voltage.

8. The circuit of claim 5, wherein the control circuit substantially prevents current from flowing through the current regulator when the A.C. voltage exceeds a predetermined voltage.

9. The circuit of claim 5, wherein the control circuit substantially prevents current from flowing through the current regulator when one of the D.C. voltages reaches a predetermined voltage.

10. The circuit of claim 5, wherein the current regulator comprises a MOS transistor.

11. The circuit of claim 10, wherein the control circuit charges a gate of the MOS transistor at a first rate and discharges the gate at a second rate.

12. The circuit of claim 10, wherein the control circuit protects a gate of the MOS transistor against damage from currents.

13. The circuit of claim 5, wherein the two D.C. voltages are derived from a single A.C. input voltage.

14. A power variator, comprising:
   first and second switches; and
   a driver circuit for providing first and second D.C. voltages to the first and second switches, the driver circuit including:
      first and second input terminals configured to receive an A.C. voltage;
      a first capacitor comprising a first electrode and a second electrode, the first electrode being connected to the first input terminal, wherein a first D.C. voltage is provided across the first capacitor;

a second capacitor comprising a first and a second electrode, the first electrode of the second capacitor being connected to the second input terminal, wherein a second D.C. voltage is provided across the second capacitor;

a first diode pair of diodes having respective anodes directly connected together in common, and respective cathodes respectively connected to the second electrodes of the first and second capacitors;

a second diode pair of diodes having respective cathodes directly connected together in common, the second diode pair coupling the first input terminal to the second input terminal;

a current regulator comprising a first terminal coupled to the anodes of the first diode pair and a second terminal coupled to the cathodes of the second diode pair; and a control circuit coupled to the cathodes of the second diode pair of diodes and configured to control current flowing through the current regulator.

15. The power variator of claim 14, wherein the reference circuit comprises a third diode pair of diodes having respective anodes directly connected together in common, the third diode pair coupling the first input terminal to the second input terminal, wherein the control circuit is coupled to the anodes of the third diode pair.

16. The power variator of claim 14, wherein the control circuit substantially prevents current from flowing through the current regulator when one of the D.C. voltages reaches a predetermined voltage.

17. The power variator of claim 14, wherein the current regulator comprises a MOS transistor and the control circuit charges a gate of the MOS transistor at a first rate and discharges the gate at a second rate.

* * * * *

UNITED STATES PATENT AND TRADEMARK OFFICE

CERTIFICATE OF CORRECTION

| | | |
|---|---|---|
| PATENT NO. | : 7,605,495 B2 | Page 1 of 1 |
| APPLICATION NO. | : 11/244423 | |
| DATED | : October 20, 2009 | |
| INVENTOR(S) | : Raynald Achart | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Fifth Day of October, 2010

David J. Kappos
*Director of the United States Patent and Trademark Office*